United States Patent [19]

Bobbink et al.

[11] Patent Number: 5,013,816

[45] Date of Patent: May 7, 1991

[54] PREPARATION OF PARTICULATE POLYMERS

[75] Inventors: Hendrikus Bobbink, Neuhofen; Hermann Fischer, Limburgerhof; Gerhard Heinz; Klaus Matthias, both of Weisenheim; Joachim Seibring, Lambsheim; Wolfgang Stegmaier, Hassloch, all of Fed. Rep. of Germany

[73] Assignee: BASF Aktiengesellschaft, Ludwigshafen, Fed. Rep. of Germany

[21] Appl. No.: 133,643

[22] Filed: Dec. 16, 1987

[30] Foreign Application Priority Data

Dec. 24, 1986 [DE] Fed. Rep. of Germany ....... 3644464

[51] Int. Cl.$^5$ ........................ C08G 8/02; C08G 75/20; C08F 3/00
[52] U.S. Cl. .................................... 528/173; 528/125; 528/126; 528/128; 528/480; 528/502
[58] Field of Search ............... 528/502, 480, 125, 126, 528/128

[56] References Cited

U.S. PATENT DOCUMENTS

| | | | |
|---|---|---|---|
| 3,933,764 | 1/1976 | McMaster | 528/497 |
| 3,953,401 | 4/1976 | Gabler et al. | 528/495 |
| 4,056,517 | 1/1977 | Staniland | 528/125 |

FOREIGN PATENT DOCUMENTS

| | | |
|---|---|---|
| 2403660 | 8/1974 | Fed. Rep. of Germany . |
| 2533110 | 6/1976 | Fed. Rep. of Germany . |
| 773050 | 10/1980 | U.S.S.R. . |

OTHER PUBLICATIONS

Patent Abstracts of Japan, vol. 8, No. 232 (C-248) [1669], Oct. 1874, (Japan 59-112831).

*Primary Examiner*—Morton Foelak
*Assistant Examiner*—P. Hampton-Hightower
*Attorney, Agent, or Firm*—Oblon, Spivak, McClelland, Maier & Neustadt

[57] ABSTRACT

Particulate polymers of aromatic diols I and aromatic dihalogen compound II are prepared by
(A) producing a plurality of liquid jets from a solution of the polymer by means of a nozzle,
(B) causing the liquid jet to divide into particles of equal size,
(C) precipitating the drops by introduction into a precipitation bath and
(D) removing solvent residues and other impurities.

5 Claims, No Drawings

PREPARATION OF PARTICULATE POLYMERS

The present invention relates to a process for the preparation of particulate polymers, obtainable by polycondensation of diols of the general formula I

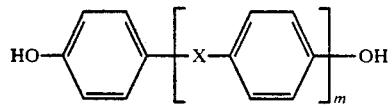

or their $C_1$–$C_6$-alkyl, $C_1$–$C_6$-alkoxy, aryl, cyano, Cl or F derivatives substituted in the nucleus, with dihalogen compounds of the general formula II

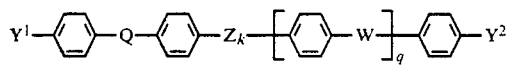

or their $C_1$–$C_6$-alkyl, $C_1$–$C_6$-alkoxy, aryl, chlorine or fluorine derivatives substituted in the nucleus, where X and Z are each a chemical bond, —O—, —S—,

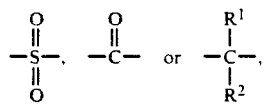

$Y^1$ and $Y^2$ are each Cl or F, Q and W are each

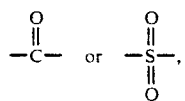

$R^1$ and $R^2$ are each hydrogen, alkyl or alkoxy, each of 1 to 6 carbon atoms, or aryl or their halogenated derivates, and k, m and q are each 0 or 1.

Polymers of the type defined above have good heat stability and have therefore become increasingly important industrially over the past few years.

Such polymers are prepared in general by polycondensation of the starting materials in polar aprotic solvents in which the resulting polymers are soluble. Before the final shaping procedure, however, it is necessary to remove as completely as possible the solvents and any salts added to improve the solubility or as catalysts, and other additives, in order to avoid adversely affecting the performance characteristics.

DE-A 24 03 660 discloses a process for isolating aromatic polymer powders, including polyethersulfones, according to which a solution of the polymers is atomized through a one-material atomizer nozzle under pressure into a stirred precipitating bath.

One-material atomizer nozzles are nozzles in which the energy required to atomize the liquid is derived from the pressurized liquid itself, ie. nozzles which operate entirely with liquid pressure.

SU Pat. No. 773,050 describes the precipitation of polysulfones from solution by introduction into a shear field with vigorous stirring. The aim of the process is to increase the bulk density of the polysulfone, ie. to obtain a very small particle size or products in powder form.

Both known processes, atomizing by means of onematerial atomizer nozzles under high pressure and introduction into a shear field with vigorous stirring, lead to powder products having a broad particle size distribution which has a disadvantageous effect during the subsequent further processing of the products, in particular during extraction, drying and conversion.

DE-C 25 33 110 describes a process for obtaining polyethersulfones by coagulation, in which a solution of the polymers is dispersed as droplets in a carrier phase and the dispersion is brought into contact with an aliphatic hydrocarbon in a turbulent shear field so that the droplets are coated by the hydrocarbon. Thereafter, the coated droplets are extracted and the organic solvent and the aliphatic hydrocarbon removed. The particle size of the resulting products is not more than 250 μm, ie. relatively small. Acccording to column 6, line 60 et seq., particles prepared by this process and having a diameter of more than 250 μm do not possess the pore structure desired for removing solvents and impurities. Since excessively small particle sizes frequently give rise to difficulties during conversion, it would be desirable to have particulate polymers having an adequate particle size and a narrow particle size spectrum.

It is an object of the present invention to provide a process for the preparation of particulate polymers in which large particles having a narrow particle size distribution and preferably having mean particle diameters (weight average) of from 0.5 to 2 mm are obtained, the said particles being readily further processable. Furthermore, the particles should preferably have an open-cell foam structure.

We have found that this object is achieved, according to the invention, by a process for the preparation of particulate polymers of the type stated at the outset, wherein (A) a solution of the polymer is allowed to emerge from a nozzle in a plurality of liquid jets, (B) the liquid jet is caused to divide into drops having a narrow particle size distribution by setting the nozzle into longitudinal or transverse vibration or by pulsation of the liquid in the nozzle or by providing a distance between the point of emergence from the nozzle and the point of entry into a precipitation bath, (C) the drops produced are precipitated by introduction into a precipitation bath which contains a liquid in which the polymer is insoluble, and (D) solvent residues and other impurities present in the polymer particles are removed.

A few compounds are listed below as preferred diols of the general formula I. Like the dihalogen compounds of the formula II, these compounds may be used individually or in any mixtures.

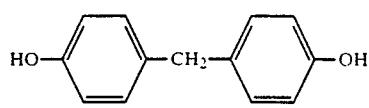

Di-(4-hydroxyphenyl)-methane

-continued 2,2-di-(4-hydroxyphenyl)-ethane 1-phenyl-1,1,-di-(4-hydroxyphenyl)methane Diphenyl-di-(4-hydroxyphenyl)methane Tetramethylbisphenol A
(2,2-di-(4-hydroxy-3,5-dimethyl-phenyl)-propane)

4,4'-dihydroxydiphenyl sulfone
(bisphenol S)

2,2'-di(4-hydroxyphenyl)-propane
(bisphenol A)

4,4'-dihydroxydiphenyl ether 4,4'-dihydroxydiphenyl sulfide
(bisphenol T)

4,4'-dihydroxybenzophenone 1,4-di-(4'-hydroxycarbonyl-phenyl)-benzene

-continued

| Formulae | |
|---|---|
| 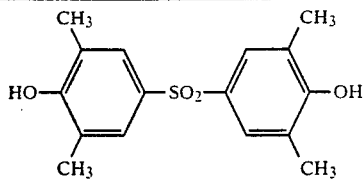 | Tetramethylbisphenol S (3,3',5,5'-tetramethyl-4,4-di-hydroxydiphenyl sulfone) |
| 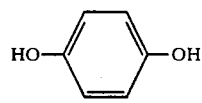 | hydroquinone |
| 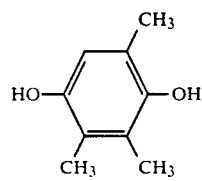 | 2,3,6-trimethylhydroquinone |
| 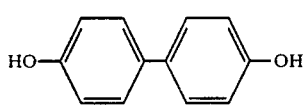 | 4,4'-dihydroxydiphenyl |
| 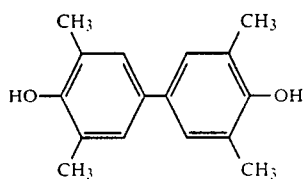 | 3,3',5,5'-tetramethyldihydroxydiphenyl |
| 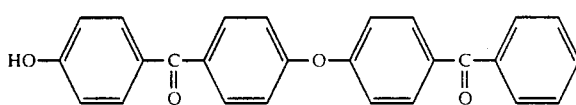 | dihydroxybenzophenone ether |

Among the above dihydroxy compounds, 4,4'-dihydroxydiphenyl, 3,3',5,5'-tetramethyl-4,4'-dihydroxydiphenyl, tetramethylbisphenol A, bisphenol A, bisphenol S, bisphenol T and 2,3,6-trimethylhydroquinone are particularly preferred.

Preferred substituents on the nucleus of the dihydroxy compounds I are alkyl or alkoxy, each of 1 to 6 carbon atoms, such as ethyl, propyl, n-butyl, iso-butyl or tert-butyl or the corresponding alkoxy groups, and aryl.

In the dihalogen compounds of the abovementioned general formula II, the substituents on the nucleus are preferably alkyl of 1 to 4 carbon atoms, eg. methyl, isopropyl, n-propyl or tert-butyl, or Cl or F.

The following dihalogen compounds of the general formula II are listed as preferred examples.

| Formulae | Name of chlorine compound |
|---|---|
| F, Cl—⟨⟩—SO₂—⟨⟩—Cl, F | 4,4'-dichlorodiphenyl sulfone |
| Cl, F—⟨⟩—CO—⟨⟩—Cl, F | 4,4'-dichlorobenzophenone |
| Cl, F—⟨⟩—CO—⟨⟩—CO—⟨⟩—Cl, F | 1,4-di-(4'-chlorocarbonylphenyl)benzene |

| Formulae | Name of chlorine compound |
|---|---|
| 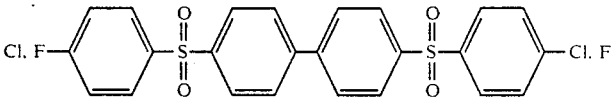 | 1,10-di-(4'-chlorophenylsulfonyl)diphenyl |
| 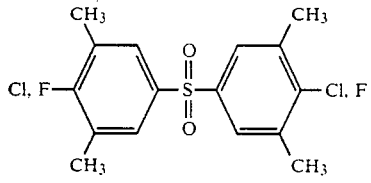 | 3,3',5,5'-tetramethyl-4,4'-dichlorodiphenyl sulfone |
| 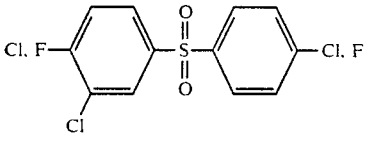 | 3'-chloro-4,4'-dichlorodiphenyl sulfone |
| 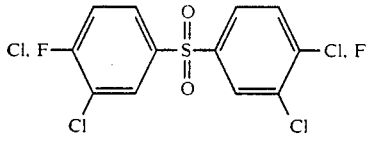 | 3,3'-4,4'-tetrachlorodiphenyl sulfone |
| 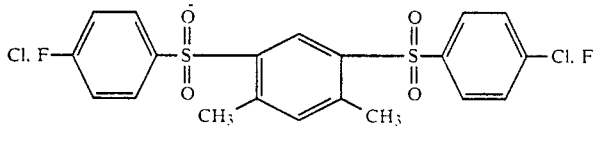 | 1,3-dimethyl-4,6-di-(4'-chlorophenylsulfonyl)-benzene |
| 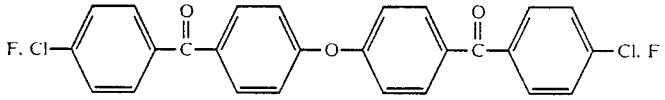 | 4,4'-di-(4-chlorophenylcarbonyl)-diphenyl ether |

Among the abovementioned dihalogen compounds, 3,3', 5,5'-tetramethyl-4,4'-dichlorodiphenyl sulfone, 1,10-di-(4'-chlorophenylsulfonyl)-diphenyl, 4,4'-difluorobenzophenone and 1,4-di-(4-chlorocarbonylephenyl)-benzene are preferred.

In the novel process, both random and block copolymers of dihydroxy compounds I and dihalogen compounds II can be used.

Preferably used polymers are polyarylethersulfones having repeating units of the formulae III and IV

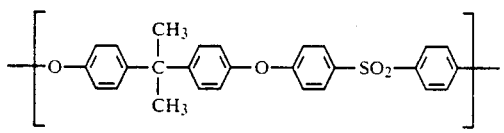

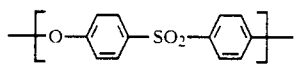

random copolymers of two or more dihydroxy compounds and/or two or more dihalogen compounds, and block copolymers of amorphous and/or partially crystalline blocks.

The relative viscosity of the polymers used is in general from 0.3 to 4.5, preferably from 0.35 to 2.0, in particular from 0.35 to 1.5, measured in 1% strength by weight solution in o-dichlorobenzene/phenol (weight ratio 1:1). This corresponds in general to weight average molecular weights of from 10,000 to 200,000.

Processes for the preparation of the polymers used in the novel process are known per se and are described in, for example, EP-A 113 112, EP-A 135 130 and EP-A 1879.

The polycondensation is particularly preferably carried out in an aprotic polar solvent using an anhydrous alkali metal carbonate as a catalyst. A particularly suitable solvent is N-methylpyrrolidone in combination with anhydrous $K_2CO_3$ as the catalyst. Examples of other aprotic solvents are dimethyl sulfoxide, dimethyl sulfone, diphenyl sulfone, dimethylacetamide and dimethylformamide.

The polymer formed is soluble in these solvents, and the reaction solutions can be used directly in the novel process.

The reaction conditions depend on the solvent selected and on the desired molecular weight of the polymers and are known per se, so that no further information is required here.

The concentration of the polymer in the solvent is in general from 5 to 40, in particular from 10 to 30, % by weight.

In step (A) of the novel process, the solutions of the polymers are divided into a plurality of liquid jets by means of a nozzle. In this procedure, it should be ensured that the throughput is not chosen so high that atomization takes place directly on emergence from the nozzle, since in this case a very irregular drop spectrum is obtained.

Preferred nozzles are capillaries having a diameter of 0.1 to 2.0 mm, in particular from 0.3 to 1.0 mm, and a throughput of from 10 to 3,000, in particular from 400 to 2,000, g/h per capillary. It is of course possible for a plurality of capillaries to be connected in parallel. The pressure upstream of the capillary is in general from 0.1 to 8 bar (from 10 to 800 kPa), in particular from 0.5 to 3 bar. In most cases, it is sufficient to place the container holding the solution of the polymer at a somewhat higher level than the nozzle and to utilize the hydrostatic pressure.

After the liquid jet has been produced, the formation of uniform drops, ie. drops of equal size, is brought about by division of the jet. This can be effected, for example, simply by providing a sufficient distance between the point of emergence from the nozzle and the point of entry into the precipitation bath. If in fact a liquid jet emerges from a capillary initially as a smooth thread or jet, waves are formed after a certain distance and lead to division of the jet into drops of equal size.

Other possible methods for effecting controlled division of the jet are setting the nozzle in vibration or pulsation of the liquid in a stationary nozzle.

The capillary may be set in longitudinal or transverse vibration. To generate longitudinal vibrations, the nozzle may be fastened, for example, to a membrane, which is set in longitudinal vibration via an oscillator with the aid of an audiofrequency generator. Instead of the audiofrequency generator, it is also possible to use a piezoelectric transducer.

Transversal vibrations are generated in general using vibrators.

Another possible method of jet division is the pulsation of the liquid in a stationary capillary, for example by means of an oscillator. In this procedure, the liquid dividing into drops passes through a vibration chamber operated by an oscillator and divides up on emergence from the capillary.

The frequencies of the oscillations or vibrations are in general from 30 to 1,000 $s^1$, in particular from 50 to 800 $s^1$.

By using such periodic perturbations, it is possible to shorten the distance from the point of emergence from the nozzle to the point of entry into the precipitation bath without adversely affecting the uniformity of the drop size.

From the above, it can be seen that the distance (height of fall) from the point of emergence from the nozzle to the point of entry into the precipitation bath can vary within wide limits, depending on the variant of the process. In general, heights of fall of from 0.1 to 2 m, in particular from 0.2 to 1.5 m, have proven advantageous, and, for the above reasons, the lower values are applicable in the case of jet division by periodic perturbations.

In step (C), the drops produced in step (B) are introduced into a precipitation bath which contains a liquid in which the polymers are insoluble. Since the nozzle as a rule is mounted above the precipitation bath, the drops produced from the jet enter the precipitation bath under the force of gravity, so that no special apparatuses are required for this purpose.

Examples of suitable nonsolvents (precipitating agents) are water and alcohols ROH of 1 to 8 carbon atoms, such as methanol, ethanol, pentanol, etc., and mixtures of water and such alcohols.

The temperature of the precipitation bath is in principle not critical and is generally from room temperature to just below the boiling point of the precipitation medium. In order to avoid losses due to evaporation, the entire apparatus (nozzle and precipitation bath) can be designed as a closed system and kept under a protective gas or slightly superatmospheric pressure. However, it is also possible, and frequently advantageous, to carry out the procedure under atmospheric pressure.

In the final step (D), the solvent residues and other impurities still present in the polymer particles formed in the precipitation process are removed after the polymer particles have been isolated from the precipitation medium.

This can be done by conventional methods for purifying solid particles, such methods being described in the literature. Washing followed by drying (if poorly volatile impurities are no longer present, it may be possible for purification to be carried out directly by evaporating the solvent) and known extraction processes may be mentioned here merely by way of example.

It has proven particularly advantageous to remove the solvent and any impurities by means of solid/liquid extraction. Examples of suitable solvents are water, alcohols of 1 to 8 carbon atoms, in particular methanol or ethanol, acetone and mixtures of these.

The conditions in the extraction depend of course on the type of extraction solvent chosen, but may otherwise vary within wide limits. For example, the procedure may be carried out under superatmospheric or reduced pressure and, if required, under protective gas atmosphere. In general, it is carried out under atmospheric pressure.

Suitable protective or inert gases are nitrogen and noble gases, in particular argon.

The extraction temperature depends on the extracting agent chosen and is preferably just below the boiling point of this agent.

After the extraction solvent has been removed, the particulate polymers can be converted in a conventional manner and prepared for further use.

The novel process gives particulate polymers having a very narrow size distribution, ie. very uniform particles, which is advantageous during further conversion. The mean particle size is in general from 100 μm to 10 mm, preferably from 300 μm to 5 mm, in particular from 400 μm to 4 mm.

In general, the size of not less than 70, in particular not less than 75, % of all particles is within ±10% of the mean particle size.

EXAMPLES 1 TO 4

Solutions of the following polymers were prepared:

L1: 18% strength by weight solution (in N-methylpyrrolidone) of a polyaryl ether sulfone having repeating units of the general formula III, the polymer possessing a reduced viscosity of 0.6 dl/g, measured in 1% strength by weight solution in o-dichlorobenzene/phenol (weight ratio 1:1).

L2: 18% strength by weight solution (in N-methylpyrrolidone) of a polyaryl ether sulfone having repeating units of the general formula IV, the polymer possessing a reduced viscosity of 0.7 dl/g, measured as for L1.

L3: 18% strength by weight solution (in N-methylpyrrolidone) of a random copolymer of bisphenol A, 4,4'-dihydroxydiphenyl sulfone (molar ratio 1:1) and 4,4'-dichlorodiphenyl sulfone, having a reduced viscosity of 0.8 dl/g, measured as for L1.

L4: 18% strength by weight solution (in N-methylpyrrolidone) of a block copolymer of 50 mol % of blocks of the structural unit III and 50 mol % of blocks of the structural unit IV, having a weight average molecular weight of the blocks of 15,000 and a viscosity number of 71, determined according to DIN 53,726/8.

The polymers for the solutions L1 to L3 were prepared in a conventional manner by reacting the monomers in N-methylpyrrolidone in the presence of potassium carbonate.

The block copolymer for solution L4 was prepared by a two-stage reaction in which first 4,4'-dichlorodiphenyl sulfone and bisphenol A (3% molar excess) were reacted in the presence of potassium carbonate (10% molar excess) in a 3:1 mixture of N-methylpyrrolidone and chlorobenzene for 4 hours at 170° C. and then for 4 hours at 190° C. Thereafter, 4,4'-dihydroxydiphenyl sulfone and 4,4'-dichlorodiphenyl sulfone (8% molar excess) and potassium carbonate (10% molar excess), based on total monomers of stage II, and 1.5 times the amount by weight (based on total monomers of stage II) of N-methylpyrrolidone were added and condensation was carried out for 2 hours at 170° C. and for 6 hours at 190° C. The polycondensation was terminated by passing in $CH_3Cl$.

The polymer solutions L1 to L4 were divided into liquid jets with the aid of a capillary nozzle plate containing 20 capillaries having a diameter of 0.8 mm. The throughput per capillary was 1.250 g/h. After emergence from the capillaries, the liquid jets covered a distance of 0.5 m before they entered a precipitation bath consisting of water. After isolation, and extraction of solvent residues and impurities with the aid of water, the polymer particles were dried. The mean particle size (weight average) of the products was 1.5 mm, and 75% by weight of all particles had a diameter within ±10% of the mean.

The particles had an open-cell foam structure.

We claim:

1. A process for the preparation of a particulate polymer having a mean particle size of 400 μm to 4 mm, obtainable by polycondensation of a diol of the formula I

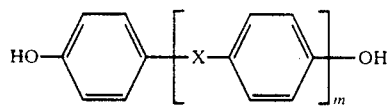

or one of its $C_1$–$C_6$-alkyl, $C_1$–$C_6$-alkoxy, aryl, cyano, Cl or F derivatives substituted in the nucleus, with a dihalogen compound of the formula II

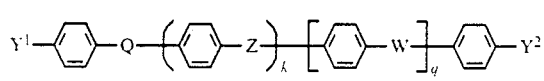

or one of its $C_1$–$C_6$-alkyl, $C_1$–$C_6$-alkoxy, aryl, chlorine or fluorine derivatives substituted in the nucleus, where X and Z are each a chemical bone, —O—, —S—,

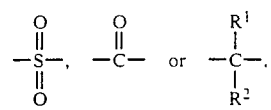

$Y^1$ and $Y^2$ are each Cl or F, Q and W each

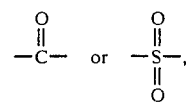

$R^1$ and $R^2$ are each hydrogen, alkyl or alkoxy, each of 1 to 6 carbon atoms, or aryl or their halogenated derivatives, and k, m and q are each 0 or 1, wherein
(A) a solution of the polymer is allowed to emerge under pressure of from 0.1 to 8 bar from a nozzle in a plurality of liquid jets,
(B) the liquid jet is caused to divide into drops having a narrow particle size distribution by setting the nozzle into longitudinal or transverse vibration or by pulsation of the liquid in the nozzle or by providing a distance between the point of emergence from the nozzle and the point of entry into a precipitation bath,
(C) the drops produced are precipitated by introduction into a precipitation bath which contains a liquid in which the polymer is insoluble, and
(D) solvent residues and other impurities present in the polymer particles are removed.

2. A process as claimed in claim 1, wherein capillaries having a diameter of from 0.1 to 2.0 mm and a throughput of from 10 to 3,000 g/h per capillary are used as the nozzle is step (A).

3. A process as claimed in claim 1, wherein a polyaryl ether sulfone having repeating units of the formulae III or IV or III and IV

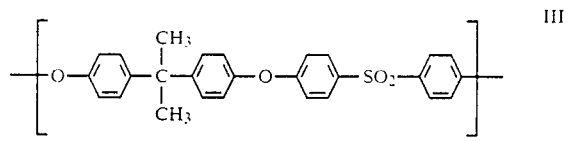

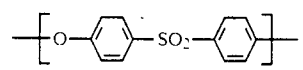

is used as the polymer.

4. A process as claimed in claim 1, wherein a random copolymer of two or more dihydroxy compounds or two or more dihalogen compounds or two or more dihydroxy compounds and two or more dihalogen compounds is used as the polymer.

5. A process as claimed in claim 1, wherein a block copolymer having amorphous or partially crystalline or amorphous and partially crystalline blocks is used as the polymer.

* * * * *